March 10, 1942.  W. R. LANDY  2,275,533
CHRISTMAS TREE ILLUMINATING SYSTEM
Filed March 28, 1940  2 Sheets-Sheet 2
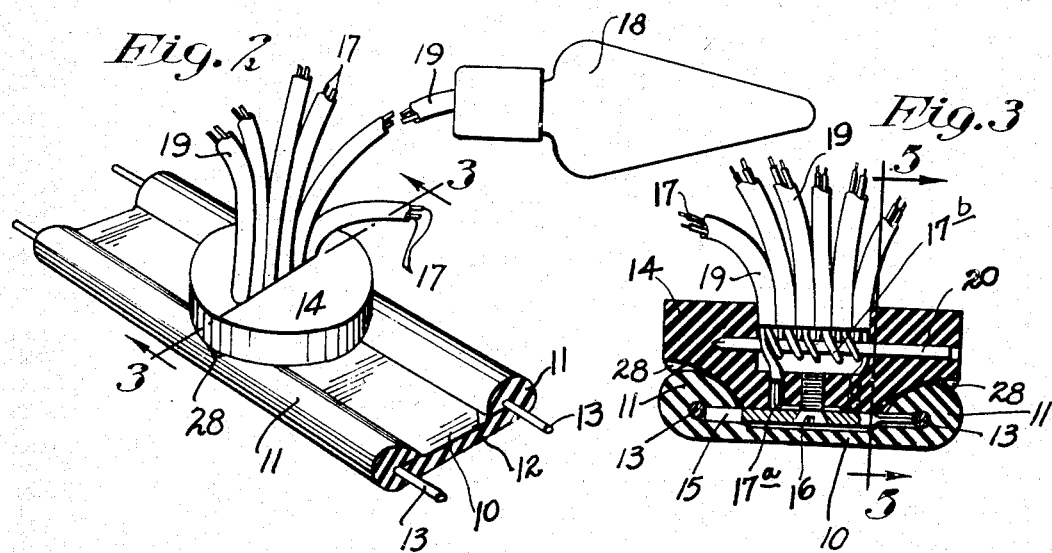
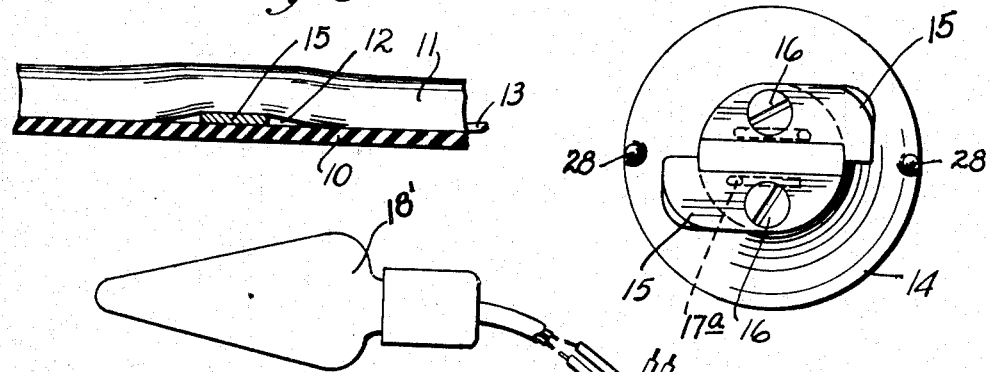
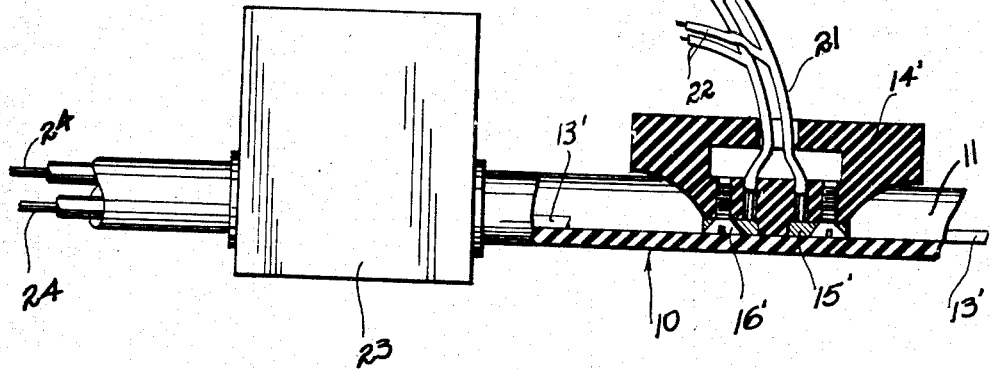
Inventor
William R. Landy
By his Attorneys Patented Mar. 10, 1942

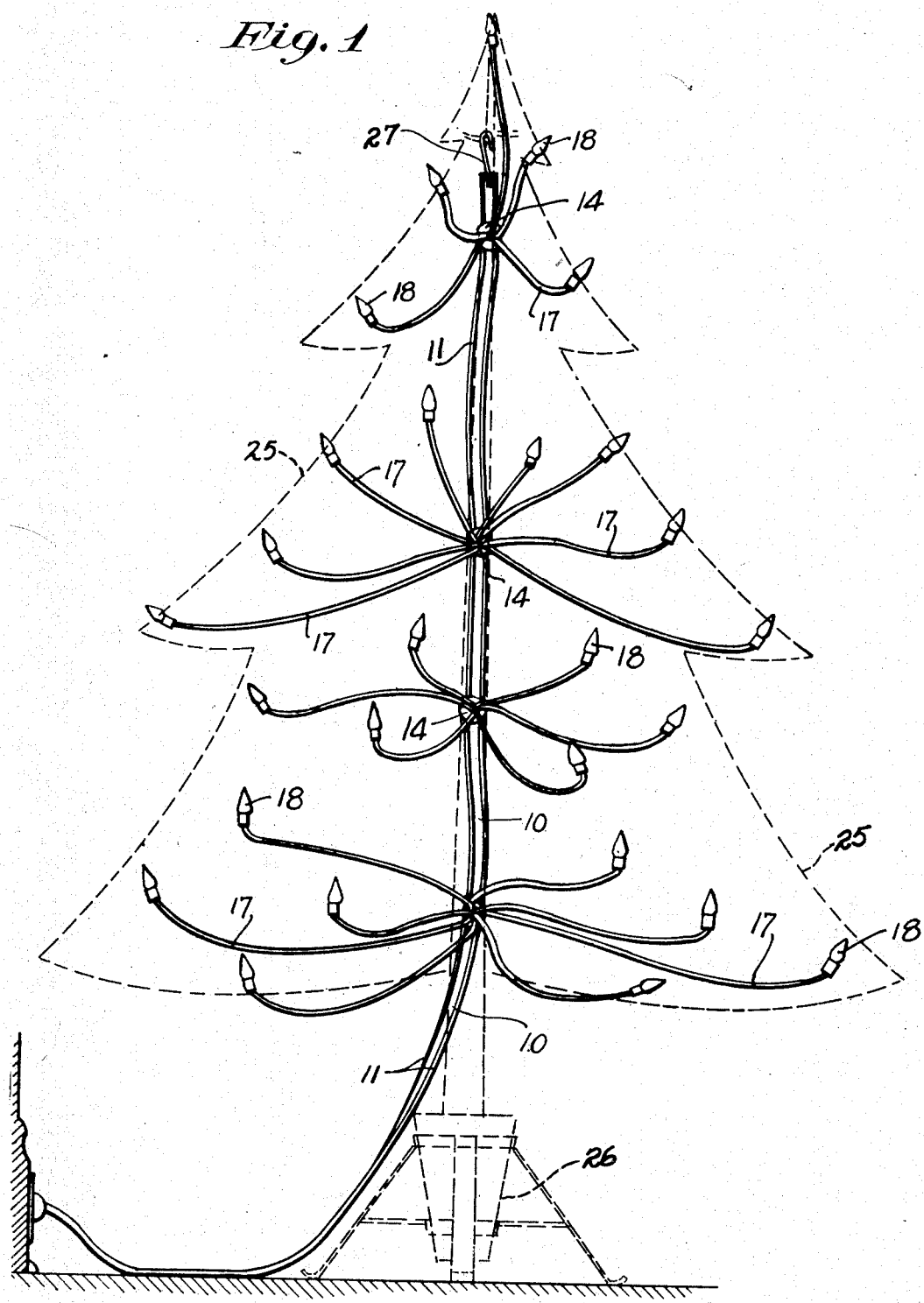

2,275,533

UNITED STATES PATENT OFFICE 2,275,533

CHRISTMAS TREE ILLUMINATING SYSTEM

William R. Landy, Minneapolis, Minn.

Application March 28, 1940, Serial No. 326,396

1 Claim. (Cl. 173—334.1)

My invention provides an improved manner of electrically illuminating Christmas trees and the like, and, generally stated, consists of the novel devices, combinations of devices and arrangement of parts hereinafter described and defined in the claim.

Hitherto electrical illuminating systems or schemes for Christmas trees have been provided by the use of light bulbs and lead wires in such promiscuous arrangement that the leads to the various bulbs were necessarily applied at random and wound or distributed throughout the tree in all sorts of uncertain ways. My invention starts from the observation that trees of the class used for Christmas trees have branches that leave the tree trunks in groups at various elevations. With these facts in mind, I have devised a wiring system which includes a main or trunk lead insulator, adapted to follow the tree trunk, combined with coupling heads that have groups of branch leads that radiate therefrom and extend to the various light bulbs. With this arrangement the coupling heads will be adjusted on the main leads to positions corresponding to the places where the branches leave the tree trunk, and from which positions the branch leads can be spread out from the tree trunk following the various branches, thereby positioning the bulbs on the various branches without winding or greatly distorting the branch lead wires.

The insulation for the trunk leads is flexible, being preferably made of rubber, the said main lead insulator involves tubular portions preferably cast integral with the common plate or web. The tubular portions of this insulation are formed with longitudinal self-closing slits through which contact blades of the coupling heads may be entered into engagement with the main or trunk leads. With such an arrangement the coupling heads may be vertically adjusted on the main lead insulation to the desired positions above indicated.

The invention is illustrated in the accompanying drawings wherein like characters indicate like parts throughout the several views.

Referring to the drawings:

Fig. 1 is a view in elevation diagrammatically showing a Christmas tree and illustrating the manner of applying my improved electric lighting system thereto;

Fig. 2 is a view in perspective showing a section of the main lead insulator, one of the coupling heads, and the branch leads to the light bulbs, only one of which bulbs is shown, certain parts being broken away;

Fig. 3 is a transverse section taken approximately on the line 3—3 of Fig. 2;

Fig. 4 is a bottom plan view of the coupler head showing the same removed from the main insulator;

Fig. 5 is a detail in longitudinal section taken on the line 5—5 of Fig. 3, some parts being removed; and Fig. 6 is a view partly in elevation and partly in section, and with some parts broken away, illustrating a somewhat modified arrangement of the wiring system.

The main or trunk lead, as preferably constructed, includes a flexible rubber ribbon 10 formed integral at its edges with tubular portions 11 having self-closing longitudinal slits 12. The main lead wires 13 are extended through the tubular portions 11 and are insulated only by the said tubular portions. The slits 12, it will be noted, are on the level with the face of the ribbon portion 10.

The coupling heads 14 are of a vulcanized or hard rubber or similar insulating material, the under sides of which are under-cut so as to closely engage the tubular portions 11. Knife edged contact blades 15 are secured to the hub-like bottoms of the coupling heads 14 by means of screws 16 or the like and are insulated from each other by the insulating material of said coupling heads. The ends of the blades 15 project in opposite directions to such an extent that when the heads are applied and turned, as shown in Fig. 3, the projecting edges of the blades 15 will engage one of the lead wires 13.

Of the said coupling heads just described there will be a number to correspond more or less closely to the number of branching points of the tree. Branch wires 17 that lead to and from light bulbs 18 are connected in series with the contact blades 15. The wires that lead to and from the several bulbs of the group controlled by the particular coupling head are shown as encased in flexible insulating tubes 19. The direct connections between the terminals of the group of wires 17 are shown as attached to the blades 15 by wire terminals 17a and intermediate portions 17b of the said wires 17 that are contained within the cavity of the head 14 are shown as turned about an anchoring pin 20. These portions 17b have insulating coverings that prevent short circuits between the adjacent portions 17b.

When a coupling head is being connected in circuit at any point along the flexible main lead insulation 10—11, the said head will be turned so that its blades 15 will project in the channel of the said insulation; and then to make the electric circuit connection, the head is turned 90° so that a sharp edge projecting portion of the contact blades 15 will enter through the slits 12 and come into direct contact with the lead wires 13, thereby simultaneously connecting in series all of the light bulbs in that particular group.

By the means described it is evident that the various coupling heads, with its group of wires and bulbs, may be connected at any elevation to bring the group approximately into the plane where the group of branches extend from the tree trunk. When the coupling heads are thus applied, the various branch leads may be simply spread out along the corresponding group of branches.

In Fig. 6 the main or trunk lead insulation 10—11 with the described slits 12 will be employed. The coupling head here illustrated is of substantially the form above described, but is here indicated by the character 14' and is provided with blades 15' like the blades 15 applied to the hub of the coupling head by screws 16' or the like. Branch lead wires 21 and 22 extend from the contact blades 15' and through extension wires 23 connect the several bulbs 18' of the group in parallel or multiple. Also in Fig. 6 the numeral 23 indicates a transformer that connects the main lead wires 13' to supply wires 24.

In Fig. 1 a Christmas tree is diagrammatically outlined by dotted lines 25 and the said tree is shown as supported from a conventional tree holder 26.

In Fig. 1 I have shown means for supporting the main lead insulator along the trunk of the tree; and this means, as illustrated, includes a hook 27 applied to the upper end of the said insulator and adapted to be hooked over an upper tree limb.

The so-called main lead insulator above described involves the use of two longitudinally slit wire insulating tubes which, in the preferred arrangement, are tied together by flexible ribbon or web, and this has an advantage over independent or disconnected insulating tubes because the tubes are properly spaced making it unnecessary to provide guiding or gripping means on the coupling heads for accomplishing that result.

It will, of course, be understood that the invention above described is capable of various modifications as to details of construction and arrangement of parts all within the scope of the invention herein disclosed.

In this preferred arrangement, the coupling head 14 is provided with knobs 28, which when the coupling head is turned, as shown in Fig. 2, project over tubular portions and prevent the said head from being accidentally turned in a releasing position.

It is important to note that the main insulator 10 is of resilient rubber or other flexible material so that it can be bent into different forms, and may be, if desired, wrapped around the tree trunk.

What I claim is:

In a device of the kind described, a ribbon, the body of which is made of flexible resilient material that is an electrical insulator, said ribbon having substantially tubular marginal portions and an intervening flat portion, said tubular portions having self-closing slits that are substantially in the plane of an exposed face of said ribbon, and electric lead wires embedded in the tubular marginal portions of said ribbon at the inner extremities of the slits thereof, in combination with a coupling head formed with a hub provided with diametrically projecting sharp edged contact blades for opening and entering said slits upon rotation of said hub, to make contact with said lead wires, said contact blades having circuit leads, and said coupling head having outstanding knobs for engaging and pressing against the tops of the tubular portions of said ribbon upon said rotation of the hub and thereby insure pressing of the slit portions of said ribbon against said contact blades.

WILLIAM R. LANDY.